(12) United States Patent
Ishigami et al.

(10) Patent No.: US 7,785,425 B2
(45) Date of Patent: Aug. 31, 2010

(54) METHOD FOR PASSIVATING STAINLESS STEEL PRODUCT AND METHOD FOR PRODUCING STAINLESS STEEL SEPARATOR FOR FUEL CELL

(75) Inventors: Osamu Ishigami, Sayama (JP); Tetsuya Kondo, Sayama (JP); Yoshimitsu Ogawa, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 588 days.

(21) Appl. No.: 10/528,794

(22) PCT Filed: Dec. 25, 2003

(86) PCT No.: PCT/JP03/16675

§ 371 (c)(1),
(2), (4) Date: Mar. 23, 2005

(87) PCT Pub. No.: WO2004/070083

PCT Pub. Date: Aug. 19, 2004

(65) Prior Publication Data

US 2005/0241732 A1 Nov. 3, 2005

(30) Foreign Application Priority Data

Feb. 7, 2003 (JP) .............................. 2003-031732
Aug. 19, 2003 (JP) .............................. 2003-295274

(51) Int. Cl.
*C23C 22/62* (2006.01)
*C23C 22/00* (2006.01)
(52) U.S. Cl. ...................................... 148/245; 148/243
(58) Field of Classification Search .................. 148/245, 148/243
See application file for complete search history.

(56) References Cited

U.S. PATENT DOCUMENTS

| 3,413,160 | A | | 11/1968 | Teumac | |
|---|---|---|---|---|---|
| 4,382,825 | A | * | 5/1983 | McCready | 134/2 |
| 4,430,128 | A | | 2/1984 | Frenier et al. | |
| 4,497,667 | A | * | 2/1985 | Vashi | 148/254 |
| 5,211,663 | A | * | 5/1993 | Kovacs et al. | 623/23.6 |
| 6,440,598 | B1 | * | 8/2002 | Fukui et al. | 429/34 |
| 2003/0034095 | A1 | * | 2/2003 | Heimann et al. | 148/245 |
| 2003/0162077 | A1 | * | 8/2003 | Ohtani et al. | 429/38 |

FOREIGN PATENT DOCUMENTS

| EP | 0 520 721 A2 | 1/2010 |
|---|---|---|
| JP | 2000323152 | 11/2000 |
| JP | 2000-336483 | 12/2000 |
| JP | 2002-012990 | * 1/2002 |

* cited by examiner

*Primary Examiner*—Roy King
*Assistant Examiner*—Jessee R. Roe
(74) *Attorney, Agent, or Firm*—Rankin, Hill & Clark LLP

(57) ABSTRACT

By a press-formed starting member (11) being immersed in a process liquid (12) at 40 to 60° C. and of pH 9 to 12, a passive film (26) is formed at the surface of the press-formed starting member. There is no solving out of metal ions from the press-formed starting member, and the passivation treatment can be carried out by just immersion in a single solution, so that costs including waste processing can be reduced. In another aspect, degreasing, cleaning and passivation treatment are carried out by spraying the press-formed starting member. By the use of spraying, the degreasing, cleaning and passivation treatment can be made rapid, and the amounts of process liquid needed for degreasing, cleaning and passivation treatment can be reduced.

2 Claims, 13 Drawing Sheets

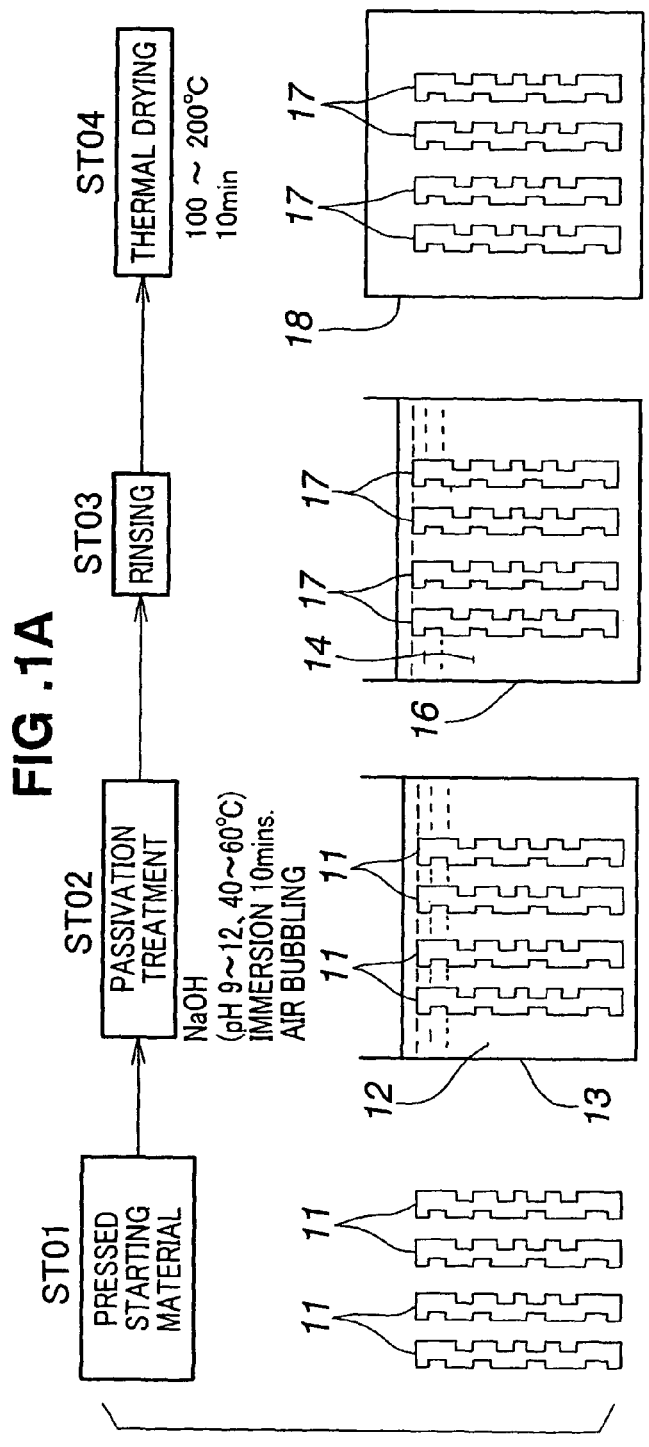
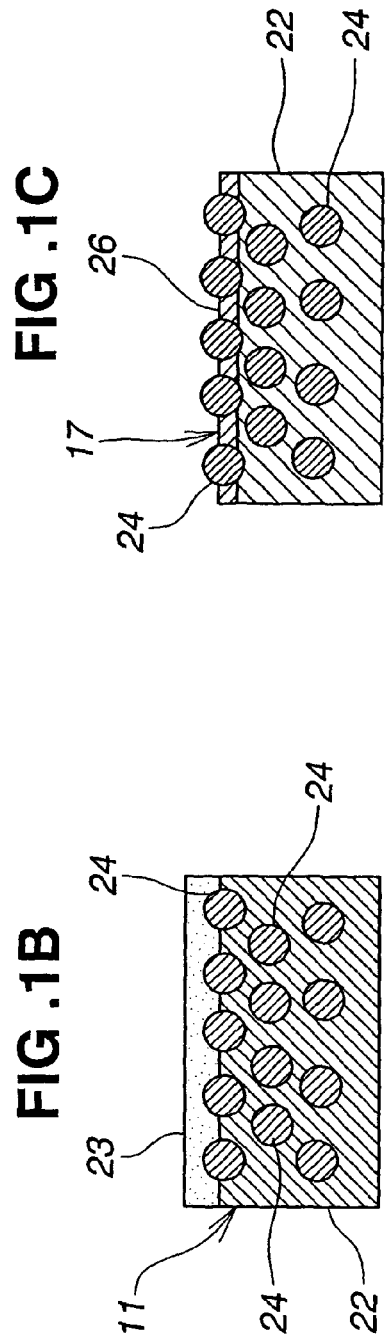
FIG. 1A
FIG. 1B
FIG. 1C

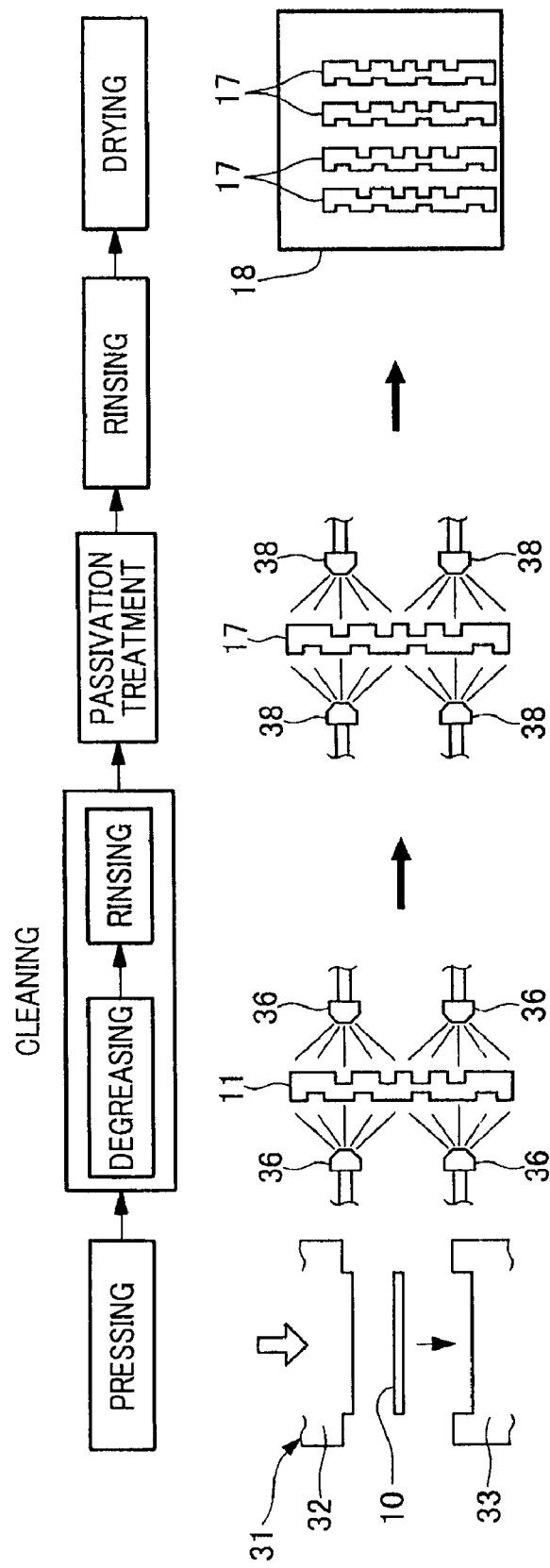
FIG. 8A
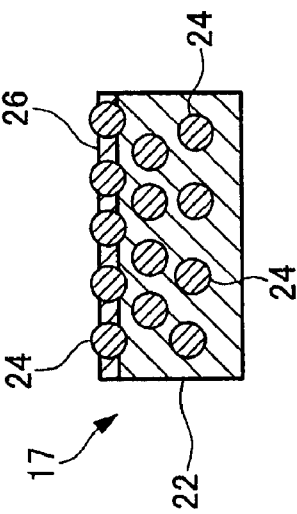
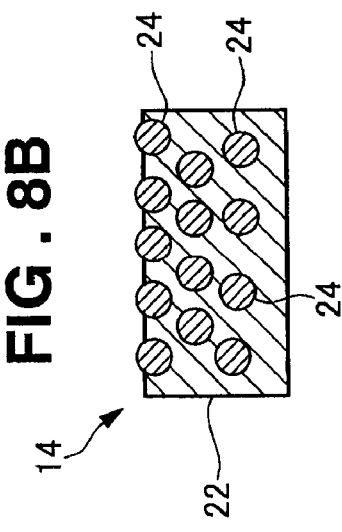
FIG. 8B
FIG. 8C

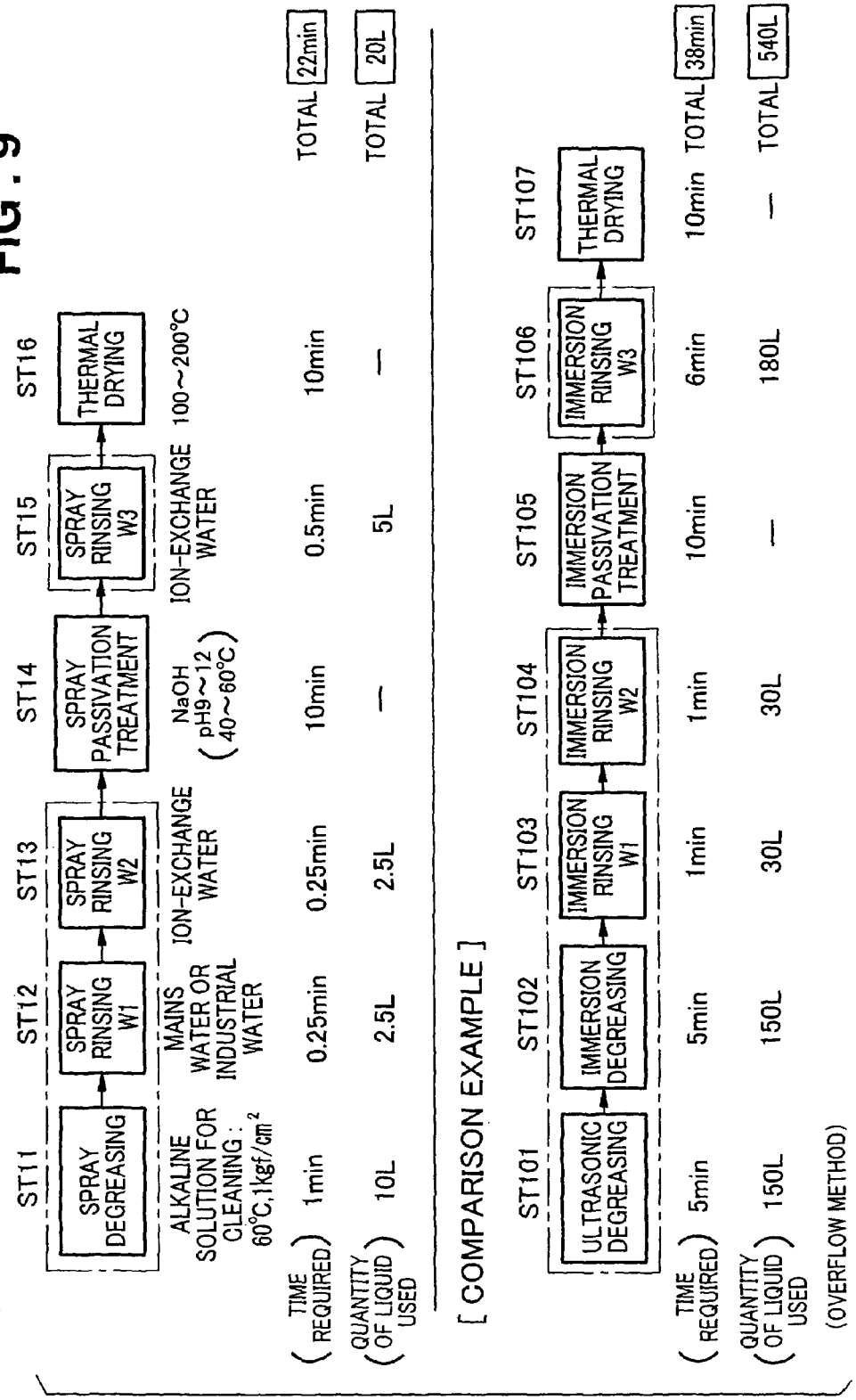

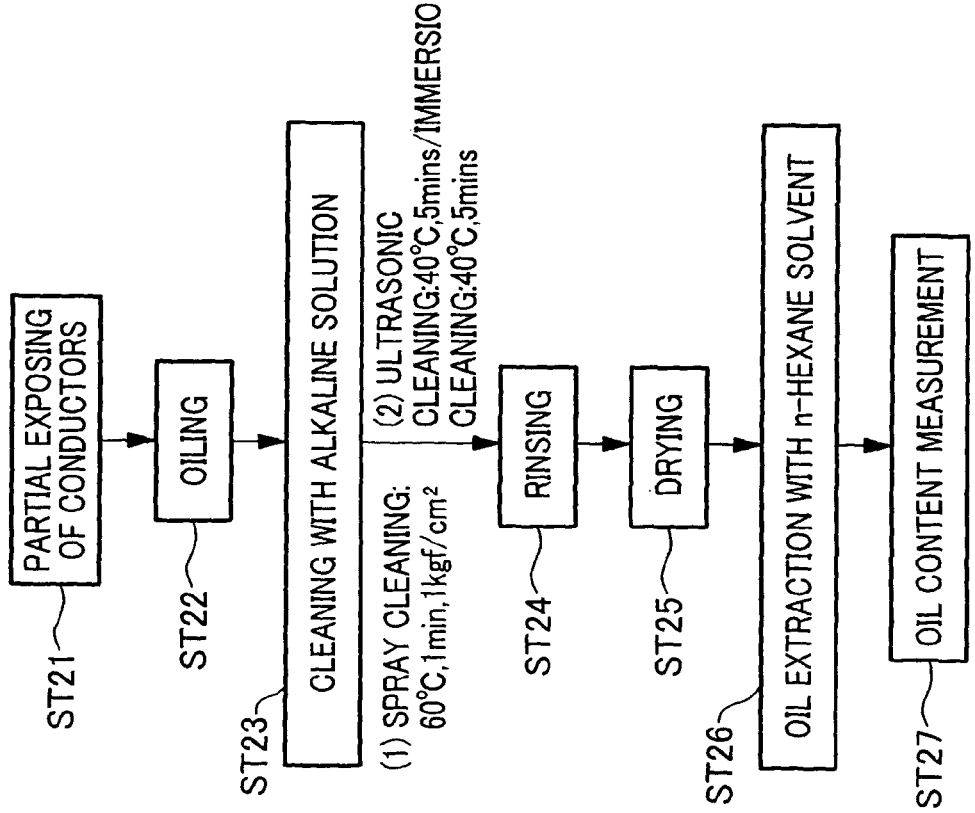
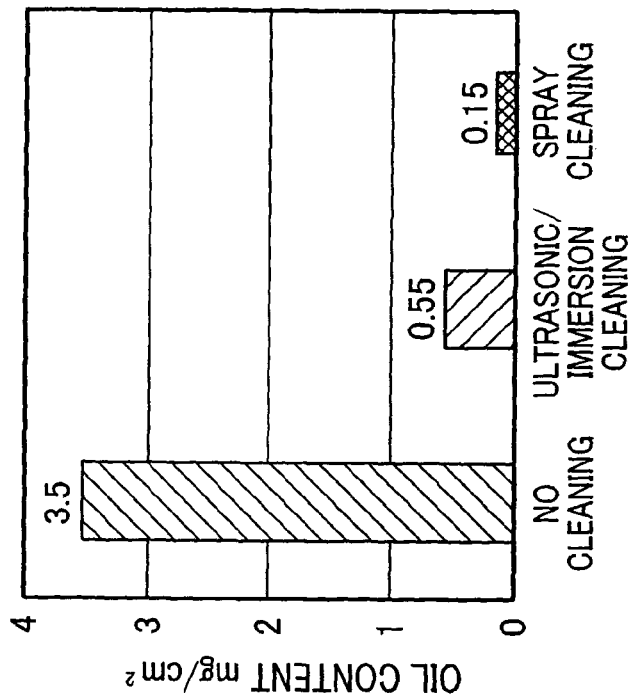

METHOD FOR PASSIVATING STAINLESS STEEL PRODUCT AND METHOD FOR PRODUCING STAINLESS STEEL SEPARATOR FOR FUEL CELL

TECHNICAL FIELD

This invention relates to a passivation treatment method for a stainless steel member for use as a separator in a fuel cell and to a method of manufacturing a stainless steel separator.

BACKGROUND ART

Because solid polymer electrolyte membrane type fuel cells are of a construction such that a desired output is obtained by a number of individual fuel cell cells being stacked together, as separators for dividing the individual fuel cells, metal materials having superior strength with respect to pressurization on stacking and compactness after stacking compared to resin materials are being seen as effective. In particular, because it forms a passive film having a high resistance to corrosion in acidic atmospheres around the electrode parts of cells, the use of stainless steel members is being studied.

As passivation treatment methods for forming this kind of passive film on a stainless steel member, those in which an acidic solution is used as a process liquid (for example (1) Japanese Laid-Open Patent No. 61-270396, (2) Japanese Laid-Open Patent No. 9-184096 and (3) Japanese Laid-Open Patent No. 2000-323152), and those in which a neutral or weakly acidic solution is used as a process liquid ((4) Japanese Laid-Open Patent Publication No. 10-280163) are known.

In the above-mentioned publication (1), a passivation treatment method for passivation-treating a stainless steel member with for example dilute nitric acid is set forth.

In the above-mentioned publication (2), a surface treatment method for electrolytically treating stainless steel with an aqueous solution of nitric acid and chromic acid is set forth.

In the above-mentioned publication (3), a separator manufacturing method is set forth in which stainless steel is acid-washed with a mixture of nitric acid and hydrofluoric acid and then a passive film is formed with nitric acid.

In the above-mentioned publication (4), a passivation treatment method is set forth in which a stainless steel sheet is coated with a solution in liquid film form containing a neutral salt electrolyte and hydrogen peroxide.

In the above-mentioned publication (1), publication (2) and publication (3), in each case, because an acid is used for the passivation treatment, metal ions solve out into the process liquid. For example, in the case of nitric acid, $Ni^{2+}$ and $Cr^{6+}$ solve out. Consequently, a great deal of cost is entailed in processing waste liquid including metal ions after the passivation treatment is finished.

And in the above-mentioned publication (4), because the process liquid is applied in a liquid film state, that is, applied for example using a brush or the like, by spraying using an atomizer, or by repeated dipping and exposure to the atmosphere, the number of steps is large, productivity is low, and as a result cost is high.

Also, as stainless steel treatment methods of this kind, those in which degreasing and passivation treatment are carried out (for example (5) Japanese Laid-Open Patent Publication No. 10-503241), those in which degreasing and etching are carried out (for example (6) Japanese Laid-Open Patent Publication No. 9-291400), those in which degreasing and polishing are carried out (for example (7) Japanese Laid-Open Patent Publication No. 2000-282276), and those in which acid cleaning are carried out (for example (8) Japanese Laid-Open Patent Publication No. 2001-214286) are known.

The above-mentioned publication (5) provides an alkali-based composition for cleaning and passivating the surface of a stainless steel sheet, and a stainless steel surface cleaning liquid is made up of an alkaline component other than alkaline salts such as carbonates+a chelating agent+water+a surfactant.

In the above-mentioned publication (6), electrolysis treatment is carried out with an aqueous solution of pH 10 to 12.5 including sodium hydroxide and sulfuric acid as an electrolyte and thereby rolling oil attached to the surface after cold-rolling of the stainless steel is removed and the concentration of Cr component in the passive film formed on the stainless steel surface is made low and the etchability of the material is improved.

In the above-mentioned publication (7), an alkaline solution is blown at the surface of a cold-rolled stainless steel sheet while it is brushed, whereby smudges (dirt) existing on the surface of the steel sheet after the cold-rolling are removed, and then polishing is carried out, whereby a stainless steel polished product having a surface nature with no pattern or pit flaws is manufactured.

In the above-mentioned publication (8), the stainless steel is acid-washed with an acidic aqueous solution to expose at least one of carbide metal inclusions and boride metal inclusions having conductivity at its surface, and then a neutralizing treatment is carried out by means of an alkaline solution of pH 7 or greater to prevent any increase in electrical contact resistance, and then rinsing with water and drying are further carried out.

The acid cleaning is carried out by immersing the stainless steel in the acidic aqueous solution or showering the acidic aqueous solution onto the stainless steel surface.

Because in the above-mentioned publication (5) the stainless steel sheet is immersed in an alkali-based solution and in the above-mentioned publication (6) the cold-rolled stainless steel is immersed in an aqueous solution including sodium hydroxide and sulfuric acid, for example if cleaning is carried out by an overflow immersion method in which the process liquid is made to overflow from the process tank during immersion, the amount of process liquid used becomes large, and, because with the immersion method the cleaning is carried out gradually, the process time becomes long as well. Also, if the amount of grease attached to the stainless steel material is large, grease may remain there after the cleaning, and certain cleaning sometimes cannot be carried out.

In the publication (8), because different acid and alkali solutions are used, processing of waste liquids must be carried out separately, and costs mount up.

Also, in the publication (7), to effect brushing while an alkaline solution is blown at the stainless steel sheet, a drive source for producing a driving force for brushing is necessary. If processing can be carried out with simple equipment, the cost of the equipment can be reduced.

DISCLOSURE OF THE INVENTION

It is an object of the present invention, with respect to a passivation treatment method for a stainless steel member, to make the waste processing of process liquids easy and furthermore to make the number of process steps low and reduce the cost incurred in passivation treatment, and, with respect to a manufacturing method of a stainless steel separator for a fuel cell, to shorten the time required for cleaning a stainless steel member serving as the material of a separator and reduce the amount of process liquid needed for cleaning, to suppress waste liquid processing costs and achieve simplification of equipment.

The invention provides a stainless steel member passivation treatment method in which a passive film is formed at the surface of a stainless steel member by the stainless steel member being dipped in an alkaline solution at 40 to 60° C. and of pH 9 to 12.

By a stainless steel member being passivation-treated with an alkaline solution, because there is no solving out of metal ions from the stainless steel member, compared to passivation-treating with acid, the cost incurred in waste liquid processing can be reduced.

Passivation treatment can be carried out with just dipping in a single solution, and the number of process steps is low and it is possible to achieve still more cost reduction.

Preferably, a pH buffer is added to the alkaline solution, or the alkaline solution itself is provided with a pH-buffer action, and by air bubbling being carried out into this alkaline solution, the formation of hydroxides to constitute a passive film is promoted by an increase in the amount of dissolved oxygen in the alkaline solution, and also falling of the pH is suppressed by carbon dioxide dissolving in the alkaline solution.

When air bubbling is carried out, $OH^-$ increases as a result of the amount of dissolved oxygen in the alkaline solution increasing, and because the increased $OH^-$ bonds with metal ions the formation of hydroxides can be promoted.

Because the air bubbling also causes carbon dioxide to dissolve in the alkaline solution as well as oxygen, due to this carbon dioxide the $H^+$ in the alkaline solution increases and causes the pH to fall, but by adding a pH buffer to the alkaline solution in advance, or providing the alkaline solution itself with a pH buffer effect, it is possible to suppress falling of the pH with the pH buffer or the alkaline solution itself.

Preferably, the stainless steel member having finished the dipping step is dried by being held at 100 to 200° C.

By thermal drying at 100 to 200° C., the passive film formed by the alkaline solution can be made more stable and resistance to corrosion can be raised further.

Also, the stainless steel member is suitable for being made into a fuel cell separator.

When a fuel cell is generating electricity, the atmospheres around the electrodes become acidic, but at the surface of a separator obtained by dipping in an alkaline solution of pH 9 to 12 and then thermal drying at 100 to 200° C., as with nitric acid passivation treatment methods of related art, because a passive film having Fe, Cr and Ni hydroxide and oxide components is formed, corrosion by oxygen can be suppressed, and stable electricity generation can be maintained over a long period.

In another aspect, the invention provides a manufacturing method of a stainless steel separator for a fuel cell, which is made up of: a step of applying a lubricant to a stainless steel member and press-forming gas flow passages and cooling water flow passages in it; a step of removing lubricant adhered to the stainless steel member by spraying the press-formed stainless steel member with an alkaline solution for cleaning; a step of removing alkaline solution for cleaning adhered to the stainless steel member by spraying washing water onto the stainless steel member; a step of removing washing water remaining on the stainless steel member by spraying ion-exchange water onto the stainless steel member; a step of spraying an alkaline solution for passivation treatment onto the stainless steel member to passivation-treat the stainless steel member; a step of removing alkaline solution for passivation treatment adhered to the stainless steel member by spraying ion-exchange water onto the stainless steel member; and a step of thermally drying the stainless steel member. By the step of removing lubricant adhered to the stainless steel member by spraying an alkaline solution for cleaning onto the stainless steel member being provided, the lubricant-removing effect can be raised by the spraying, and compared to a related art removal step based on dipping the removal time can be shortened and the amount of alkaline solution for cleaning needed for removal can be reduced.

By the cleaning with washing water and ion-exchange water and the passivation treatment being carried out by spraying, compared to a related art dipping method it is possible to shorten the time needed for these washes and passivation treatment further, and it is possible to reduce the amounts of washing water and ion-exchange water required for the washing.

Also, because the solution for cleaning and the solution for passivation treatment are both made alkaline, the respective waste liquids can be processed simultaneously, and costs can be kept down.

Also, because a drive source necessary for brushing or the like of the kind in related art is unnecessary, simplification of equipment can be achieved and the cost of equipment can be reduced.

Preferably, the alkaline solution for passivation treatment is made a solution of pH 9 to 12 brought to 40 to 60° C.

Because the stainless steel member is passivation-treated with an alkaline solution for passivation treatment, there is no solving out of metal ions from the stainless steel member, and compared to passivation treatment with acid the cost of waste liquid processing can be reduced, and passivation treatment can be carried out with just spraying with a single solution, the number of process steps is small and further cost reduction can be achieved.

Preferably, the alkaline solution for passivation treatment is a solution with a pH buffer added.

By the spray of alkaline solution for passivation treatment, falling of the pH caused by carbon dioxide dissolving in the alkaline solution for passivation treatment can be suppressed by the pH buffer, and a passive film can be formed efficiently and stably.

Also, preferably, the thermal drying is carried out at 100 to 200° C.

By thermal drying at 100 to 200° C., the passive film formed with the alkaline solution can be made more stable, and resistance to corrosion can be raised further.

Also, preferably, the alkaline solution for cleaning is a solution made by adding a surfactant to a basic salt.

Because the alkaline solution for cleaning is a solution made by adding a surfactant to a basic salt, foaming does not readily occur, and problems of draining and the like caused by foaming can be prevented.

BRIEF DESCRIPTION OF THE DRAWINGS

FIG. 1A, FIG. 1B and FIG. 1C are explanatory views showing a stainless steel separator passivation treatment method according to the invention, FIG. 1A being a process view, and FIG. 1B and FIG. 1C being sectional views of separators in different steps.

FIG. 8A, FIG. 8B and FIG. 8C are explanatory views showing a stainless steel separator manufacturing method according to the invention, FIG. 8A being a process view and FIG. 8B and FIG. 8C being sectional views of a separator starting member in different steps.

FIG. 9 is an explanatory view comparing stainless steel separator manufacturing methods.

FIG. 10A and FIG. 10B are explanatory views showing a first experiment example for confirming an effect of spray cleaning in a stainless steel separator manufacturing method according to the invention, FIG. 10A being a flow chart of sample preparation and effect confirmation and FIG. 10B a graph for comparison.

BEST MODES FOR CARRYING OUT THE INVENTION

Figure 2:
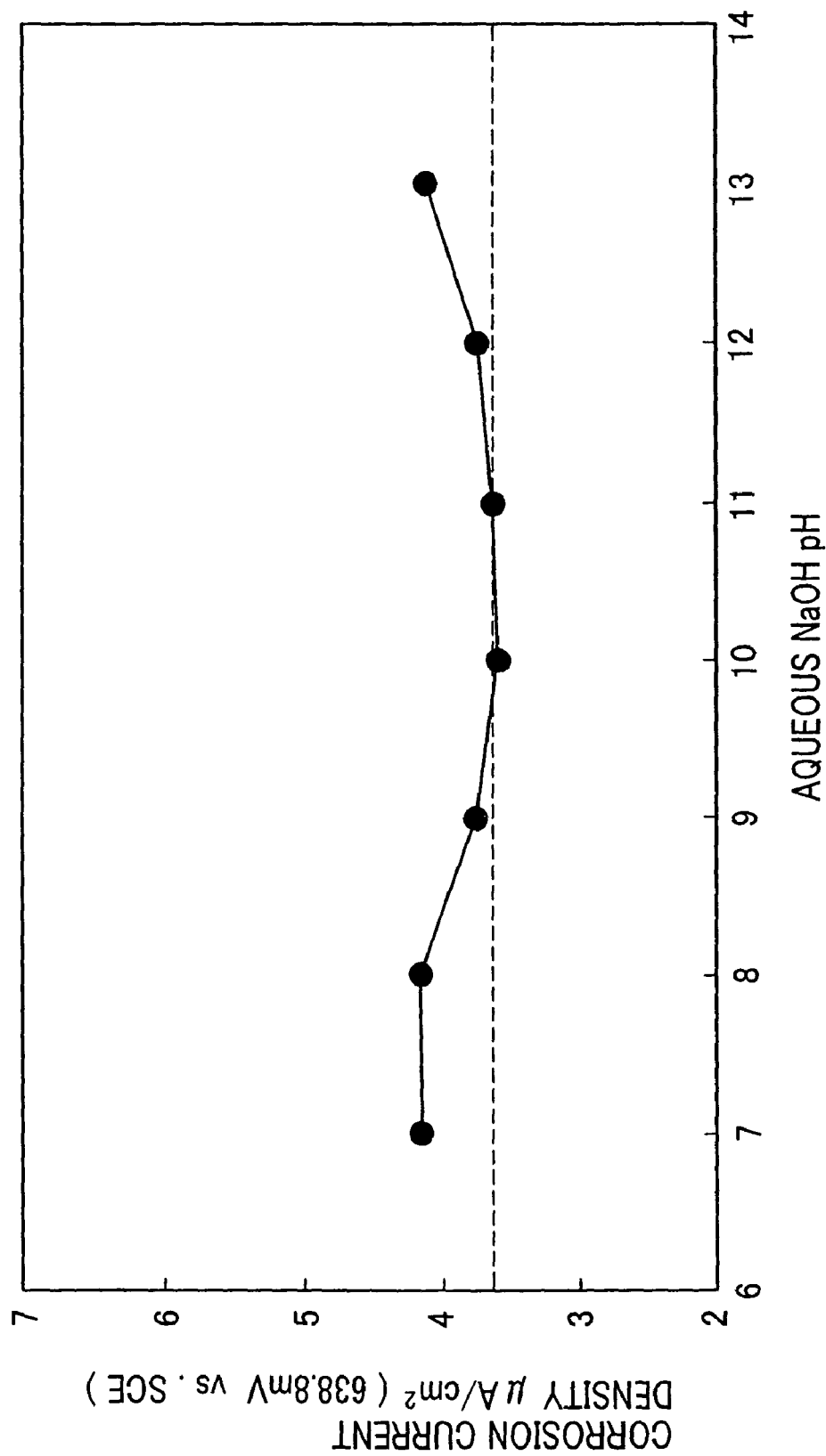
FIG. 2 is a first graph showing results of a corrosion test on samples including stainless steel members on which a passivation treatment method according to the invention has been carried out.

A separator passivation treatment method is illustrated in order in FIG. 1A. STxx denotes a step number (and similarly hereinafter).

ST01: Multiple press-formed starting members 11 made by pressing stainless steel members are prepared.

The press-forming is carried out to form grooves for supplying fuel gas and oxidant gas to a fuel cell and draining produced water when the separator finished in a final step is assembled to the fuel cell.

ST02: The multiple press-formed starting members 11 are immersed in a process tank 13 filled with a process liquid 12 (pH 9 to 12, concentration 0.00004 to 0.08 wt %) made by dissolving NaOH in distilled water (pure water). The temperature of the process liquid 12 is 40 to 60° C., the immersion time is 10 minutes, and air bubbling was carried out. The amount of air bubbling is 1000 to 2000 cm³/min (this is the same hereinafter).

Air bubbling means blowing air into the process liquid 12 to increase the amount of dissolved oxygen in the process liquid 12 and thereby promote hydroxide formation. The mechanism of this promotion of hydroxide formation by air bubbling is presumed to be as follows.

In the process liquid 12, the following reactions proceed.

$$M = M^{n+} + ne^- \qquad (a)$$

$$\tfrac{1}{2}O_2 + H_2O + 2e^- = 2OH^- \qquad (b)$$

$$M^{n+} + nOH^- = M(OH)_n \qquad (c)$$

In equation (a) the metal M ionizes and, as a result of the air bubbling, $OH^-$ is produced from oxygen, as shown by equation (b). As a result, the $OH^-$ in the process liquid 12 increases, and the production of hydroxides from metal ions and the increased $OH^-$ is promoted, as shown by equation (c).

And in the process liquid 12, as a result of the air bubbling the reactions shown below also proceed.

$$CO_2 + H_2O \rightarrow HCO_3^- + H^+ \qquad (d)$$

$$HCO_3^- \rightarrow CO_3^{2-} + H^+ \qquad (e)$$

As shown in expression (d), $H^+$ is produced from carbon dioxide and water, and as shown in expression (e), $H^+$ is also produced from $HCO_3^-$, so that $H^+$ increases and consequently the pH of the process liquid 12 falls.

However, because a pH buffer, for example $Na_2CO_3$ ($CO_3^{2-}$ becomes a conjugate base) has been added to the process liquid 12 in advance, falling of the pH of the process liquid 12 can be suppressed.

ST03: The film-formed members 17 on which a passive film has been formed in ST02 are rinsed by being dipped in a water tank 16 filled with distilled water (pure water) 14.

ST04: The rinsed film-formed members 17 are dried by heating in a thermal dryer 18. The heating temperature is 100 to 200° C., and the thermal drying time is 10 minutes.

After the film-formed members 17 are dried, the separators are finished.

In FIG. 1B, a press-formed starting member 11 consists of a base material 22 and an altered layer 23 formed at the surface of this base material 22. 24 is conductors included in the base material 22.

The altered layer 23 is formed by the step of rolling the stainless steel member before the press-forming, and is made up of oxides and metal inclusions included in the stainless steel sheet and broken up into grains of small diameter.

FIG. 1C shows a passive film 26 having been formed at the surface of the base material 22 of the film-formed member 17 by the passivation treatment with the process liquid 12 (see FIG. 1A).

FIG. 2 shows data obtained by measuring the corrosion current density of test pieces (which correspond to separators and thus have undergone the drying by heating of ST04) having had passive films formed on them with the pH of the aqueous NaOH in the passivation treatment step of ST02 in the process shown in FIG. 1A made different in each case. If the corrosion current density is small, it means that the member does not corrode readily. The vertical axis of the graph shows corrosion current density (in units of $\mu A/cm^2$), and the horizontal axis shows pH of the aqueous NaOH. The dashed line is the corrosion current density (3.6 $\mu A/cm^2$) of a test piece of related art on which a passive film was formed with nitric acid as the process liquid (this is the same hereinafter).

The corrosion test conditions are shown below.

Corrosion Test Conditions test solution: aqueous sulfuric acid (pH 3, concentration 0.005%, temperature 90° C.)

test piece potential: constant 638.8 mV (set with reference to a saturated calomel electrode (SCE)), hereinafter referred to as "638.8 mV vs. SCE"

test method: measure corrosion current density after holding the above test piece potential for 30 minutes These test conditions are common to all the corrosion tests shown below.

Looking at the variation of the corrosion current density with the pH of the NaOH, when the pH of the aqueous NaOH is 7 or 8 the corrosion current density exceeds 4 µA/cm$^2$, when the pH of the aqueous NaOH is 9 to 12 the corrosion current density is approximately the same value as when the treatment was carried out with nitric acid, and when the pH of the aqueous NaOH is 13 the corrosion current density is greater than when the treatment was carried out with nitric acid.

Thus it is desirable that the pH of the aqueous NaOH be 9 to 12.

Figure 3:
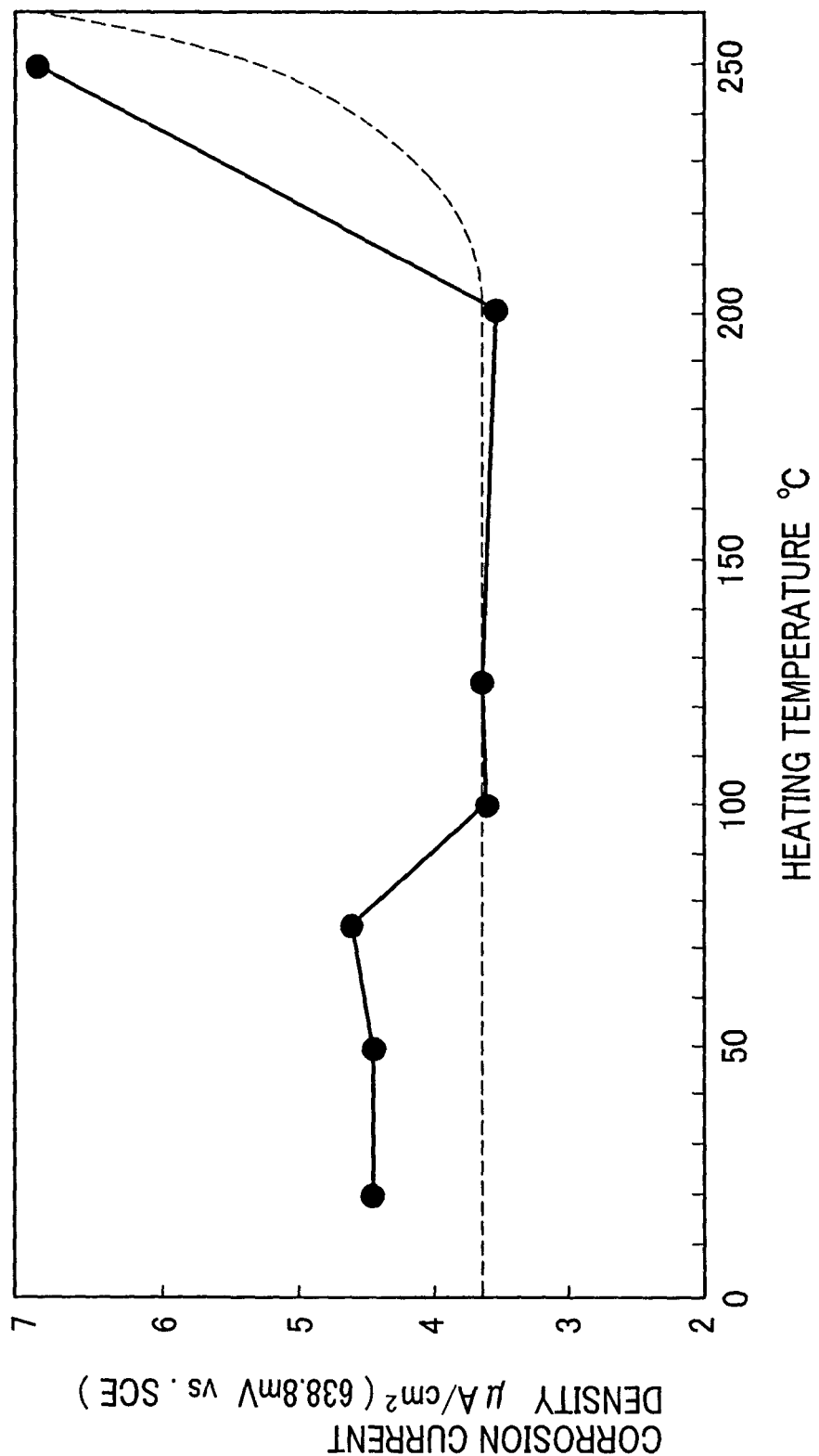
FIG. 3 is a second graph showing results of a corrosion test on samples including stainless steel members on which a passivation treatment method according to the invention has been carried out.

FIG. 3 shows data obtained by measuring the corrosion current density of test pieces having had passive films formed on them with the heating temperature of the thermal drying step of ST04 in the process shown in FIG. 1A made different in each case. At all of the heating temperatures the heating time is 10 minutes. The vertical axis of the graph shows corrosion current density (in units of µA/cm$^2$), and the horizontal axis shows heating temperature (in units of ° C.). The corrosion current density, shown with a dashed line, of the test piece of related art on which a passive film was formed with nitric acid as the process liquid, is 3.6 µA/cm$^2$ below about 210° C. and rises steeply above this temperature.

With respect to one made with nitric acid as the process liquid, the corrosion current density of the test piece made using the passivation treatment of the embodiment shown in FIG. 1A is larger below 100° C., about the same at 100 to 200° C., and larger at above 200° C.

Thus it is desirable for the heating temperature to be 100 to 200°.

Figure 4:
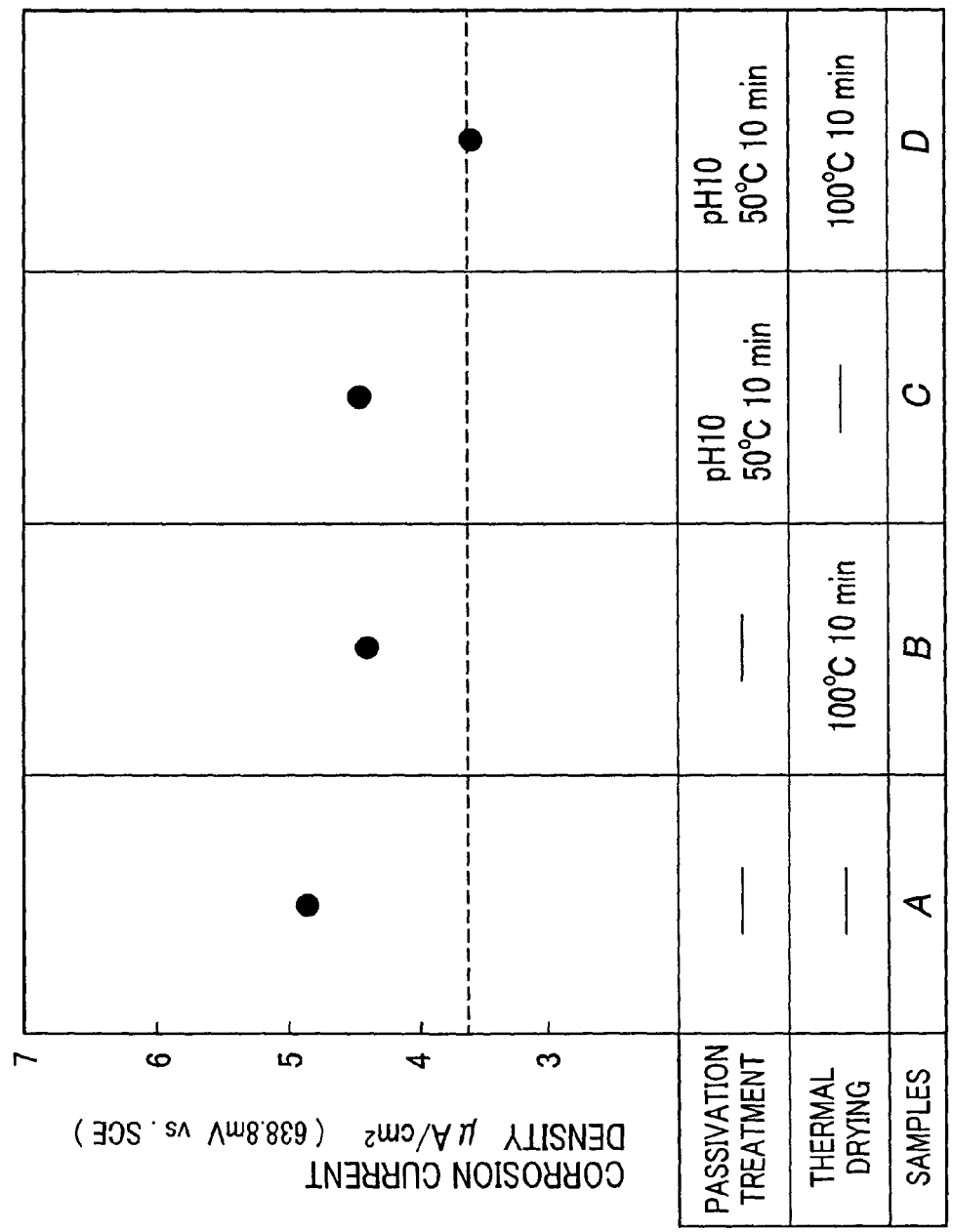
FIG. 4 is a third graph showing results of a corrosion test on samples including a stainless steel member on which a passivation treatment method according to the invention has been carried out.

FIG. 4 shows data obtained by measuring the corrosion current density of four test pieces having had passive films formed on them on the basis of the process shown in FIG. 1A. The vertical axis is corrosion current density (in units of µA/cm$^2$). The samples are as follows.

Sample

Sample A: passivation treatment and thermal drying not carried out

Sample B: passivation treatment not carried out, thermal drying carried out at 100° C. for 10 minutes Sample C: immersion in aqueous NaOH of pH 10, 50° C. for 10 minutes carried out as a passivation treatment, and drying not carried out Sample D: immersion in aqueous NaOH of pH 10, 50° C. for 10 minutes carried out as a passivation treatment, and drying carried out at 100° C. for 10 minutes When Sample A and Sample B are compared, the corrosion current density of Sample B is smaller. That is, the difference between these corrosion current densities is an effect of the drying by heating (100° C., 10 minutes).

When Sample A and Sample C are compared, the corrosion current density of Sample C is smaller. That is, the difference between these corrosion current densities is an effect of the passivation treatment (pH 10, 50° C., 10 minutes).

In Sample D, the corrosion current density is still smaller than in Sample B and Sample C, and has about the same value as when the treatment was carried out with nitric acid.

An immersion test and a corrosion resistance test shown in the table below were carried out.

TABLE 1

| | PASSIVATION TREATMENT CONDITIONS | | | | | | | | | CORROSION |
|---|---|---|---|---|---|---|---|---|---|---|
| | PROCESS LIQUID | | | | IMMER- | | THERMAL DRYING | | IMMERSION TEST | RESISTANCE TEST |
| SAMPLE | CONTENT | pH | CONCENTRATION wt % | TEMPERATURE ° C. | SION TIME Min. | AIR BUBBLING | TEMPERATURE ° C. | TIME min. | OCCURRENCE OF RUST Yes/No | CORROSION CURRENT DENSITY µA/cm$^2$ |
| Embodiment 1 | Aqueous NaOH | 10 | 0.0004 | 50 | 10 | Yes | 110 | 10 | No | 0.1 |
| Comparison Example 1 | Aqueous NaOH | 10 | 0.0004 | 50 | 10 | Yes | — | — | — | 0.14 |
| Comparison Example 2 | Aqueous Nitric acid | — | 50 | 50 | 10 | — | Room temperature | — | No | 0.15 |

The immersion test was one in which a test piece having had a passive film formed on it in the process of FIG. 1A was taken as Embodiment 1, besides this a Comparison Example 2 was prepared, and each was immersed in acid for a long period and then inspected for rust, and was carried out with the following conditions.

Immersion Test Conditions test solution: aqueous sulfuric acid at pH 3, 90° C.

immersion time: 2200 hours continuous

The corrosion resistance test was one in which a test piece having had a passive film formed on it in the process of FIG. 1A (Embodiment 1) and a Comparison Example 1 were prepared, and each was immersed in acid for a long period and had a predetermined potential applied to it and after a predetermined time had its corrosion current density measured, and was carried out with the following conditions.

Corrosion Resistance Test Conditions test solution: aqueous sulfuric acid at pH 3, 90° C.

test piece potential: 638.8 mV vs. SCE potential application time: 500 hours continuous For Embodiment 1, as the passivation treatment conditions, the process liquid was aqueous NaOH of pH 10, concentration 0.0004 wt %, temperature 50° C., the immersion time was 10 minutes, air bubbling was carried out, and the temperature of the drying by heating was 110° C. and the time was 10 min.

The result was that there was no occurrence of rust in the immersion test, and the corrosion current density in the corrosion resistance test was 0.1 $\mu A/cm^2$.

For Comparison Example 1, as the passivation treatment conditions, the process liquid was aqueous NaOH of pH 10, concentration 0.0004 wt %, temperature 50° C., the immersion time was 10 minutes, air bubbling was carried out, and drying by heating was not carried out.

The result was that the corrosion current density in the corrosion resistance test was 0.14 $\mu A/cm^2$.

For Comparison Example 2, as the passivation treatment conditions, the process liquid was aqueous nitric acid of concentration 50 wt %, temperature 50° C., the immersion time was 10 min, air bubbling was not carried out, and drying was carried out at room temperature.

The result was that there was no occurrence of rust in the immersion test, and the corrosion current density in the corrosion resistance test was 0.15 $\mu A/cm^2$.

Thus, the passivation treatment conditions of the present invention (Embodiment 1) can form a passive film having the same resistance to corrosion as the conditions of passivation treatment based on nitric acid carried out in related art (Comparison Example 2).

Figure 5:
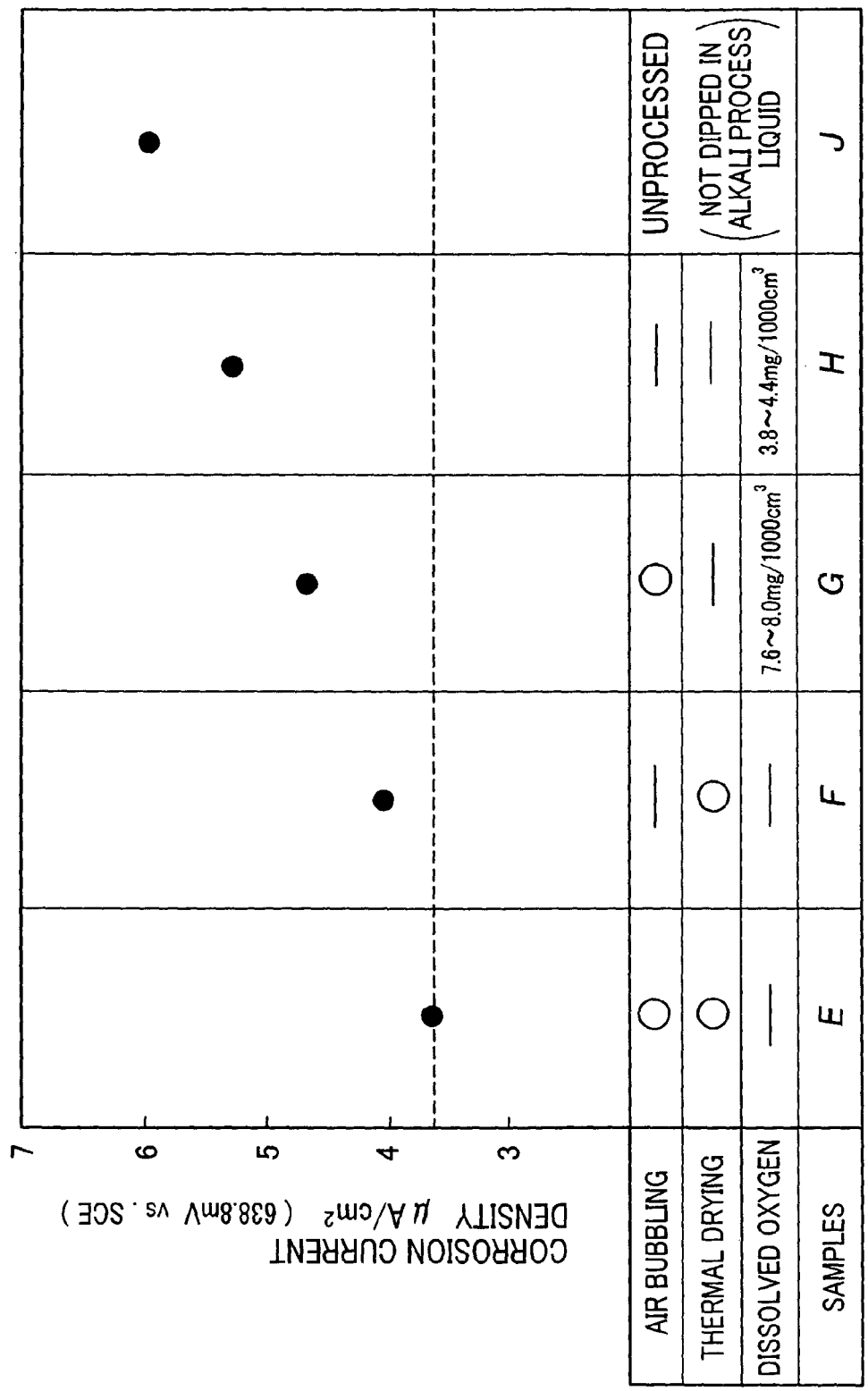
FIG. 5 is a fourth graph showing results of a corrosion test on stainless steel members confirming an effect of air bubbling and an effect of thermal drying of a passivation treatment method according to the invention.

FIG. 5 shows data obtained by preparing four test pieces having had passive films formed on them on the basis of the process shown in FIG. 1A and one test piece having had no passive film formed on it, and measuring their corrosion current densities. The vertical axis is corrosion current density (in units of $\mu A/cm^2$). The samples are as follows.

Samples

Sample E: air bubbling and thermal drying (temperature 110° C., time 10 min (this temperature and time are the same in the other samples in this test also)) carried out Sample F: air bubbling not carried out, thermal drying carried out Sample G: air bubbling carried out, thermal drying not carried out Sample H: neither air bubbling nor thermal drying carried out Sample J: unprocessed, i.e. not immersed in alkaline process liquid and no passive film formed Comparing Sample E and Sample F, when thermal drying was carried out, the corrosion current density of Sample E, on which air bubbling was carried out, is smaller.

And comparing Sample G and Sample H, thermal drying was not carried out on either sample, and in the case of Sample G, with respect to Sample H, as a result of the air bubbling being carried out the amount of oxygen dissolved in the alkaline process liquid approximately doubled from 3.8 to 4.4 mg to 7.6 to 8.0 mg per 1000 $cm^3$, and the corrosion current density of Sample G was smaller.

The difference between the corrosion current densities of Sample E and Sample F above and the difference between the corrosion current densities of Sample G and Sample H above are effects of air bubbling, and in Sample E the corrosion current density is substantially the same as when treatment is carried out with nitric acid.

From a comparison of Sample E and Sample G, when air bubbling was carried out, the corrosion current density of Sample E, where thermal drying was carried out, is smaller, and thus the effect of thermal drying is large. And from a comparison of Sample F and Sample H, when air bubbling was not carried out, the corrosion current density of Sample F is smaller, and again the effect of thermal drying is large.

Also, from a comparison of Sample H and Sample J, the effect of the immersion in an alkaline process liquid, i.e. the corrosion-resistance effect of the passive film, can be seen.

Figure 6:
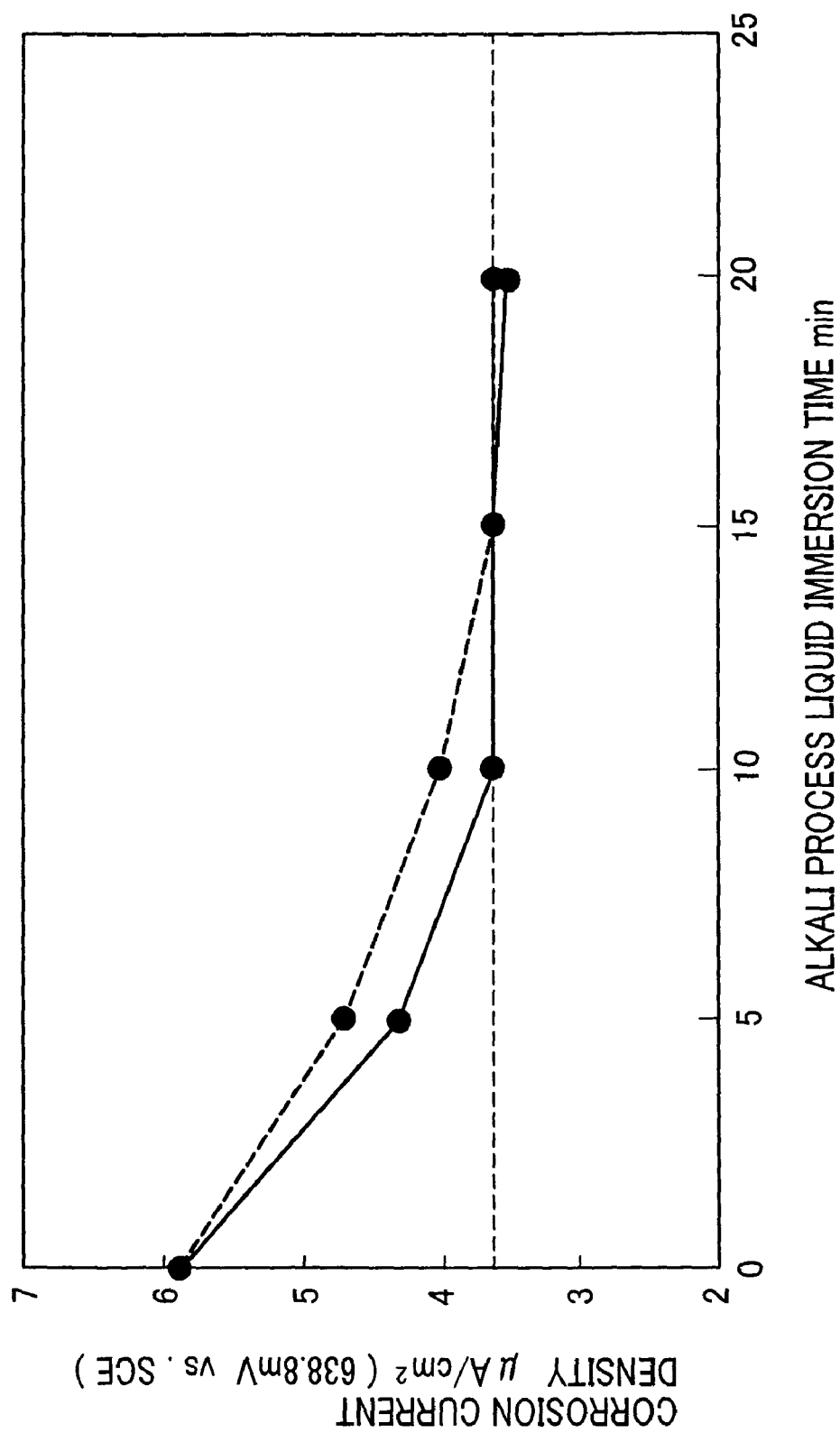
FIG. 6 is a fifth graph showing results of a corrosion test on samples including stainless steel members on which a passivation treatment method according to the invention has been carried out.

FIG. 6 shows data obtained by measuring the corrosion current densities of test pieces having had passive films formed on them with the immersion time in the alkaline process liquid, i.e. aqueous NaOH, in the passivation treatment step ST02 in the process shown in FIG. 1A made different in each case, the solid line showing cases where air bubbling was carried out and the dashed line showing cases where air bubbling was not carried out. The vertical axis of the graph shows corrosion current density (in units of $\mu A/cm^2$) and the horizontal axis shows alkaline process liquid immersion time (in units of minutes).

When air bubbling is not carried out, 15 min is needed to reach the corrosion current density 3.6 $\mu A/cm^2$ of the related art case of when treatment is carried out with nitric acid as the process liquid, but when air bubbling was carried out, 3.6 $\mu A/cm^2$ was reached in 10 min. This is the basis for the alkaline process liquid immersion time of 10 min of the present invention.

Thus, by performing air bubbling, it is possible to shorten the alkaline process liquid immersion time, i.e. the time needed for the passivation treatment step, and it is possible to raise the productivity of separators.

Figure 7:
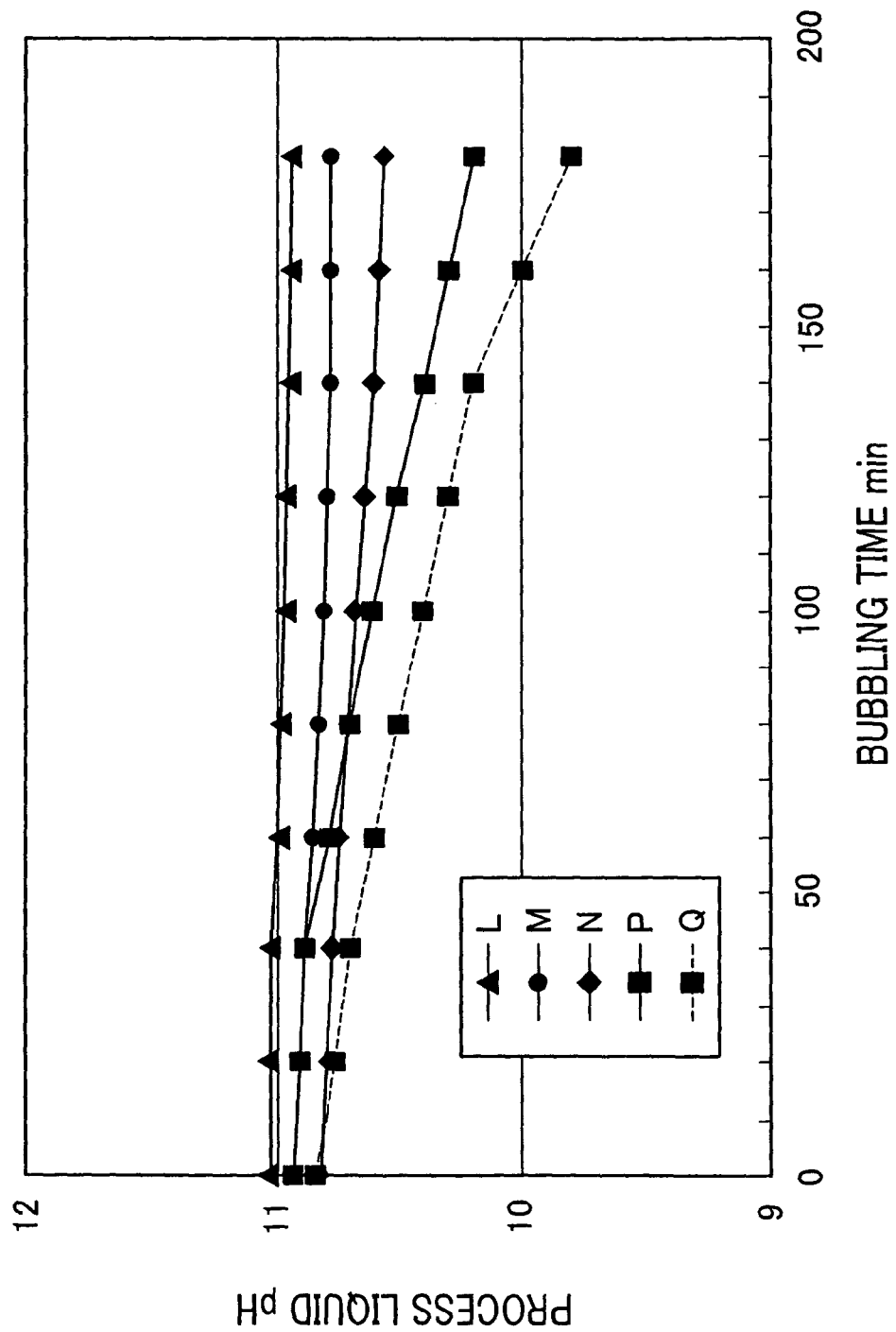
FIG. 7 is a sixth graph showing an action of bubbling and a pH buffer of a passivation treatment method according to the invention.

In FIG. 7, in the passivation treatment step ST02 in the process shown in FIG. 1A, the process liquid for performing the passivation treatment was altered and for each process liquid the pH was measured at intervals of a predetermined time while bubbling was carried out. The vertical axis of the graph shows process liquid pH and the horizontal axis shows bubbling time (in units of min). The compositions of the process liquids are as follows.

Process Liquids

Process Liquid L: 1.1 wt % aqueous $Na_2CO_3$

Process Liquid M: 0.00002 wt % aqueous NaOH with 0.55 wt % aqueous $Na_2CO_3$ added Process Liquid N: 0.0003 wt % aqueous NaOH with 0.11 wt % aqueous $Na_2CO_3$ added Process Liquid P: 0.003 wt % aqueous NaOH with 0.011 wt % $Na_2CO_3$ added Process Liquid Q: 0.0005 wt % aqueous NaOH In Process Liquid Q, because it is aqueous NaOH only, the pH of process liquid gradually falls a long way down as bubbling continues.

In Process Liquids M, N and P, as bubbling continues, the higher is the concentration of aqueous $Na_2CO_3$ the smaller is the degree of the fall in the pH of the process liquid, and in Process Liquid M it is almost flat.

In Process Liquid L, because the concentration of aqueous $Na_2CO_3$ is higher than in the other process liquids, the degree of the fall in pH is the smallest, that is, the pH buffer effect in Process Liquid L is the greatest.

Thus, when air bubbling is carried out, if an alkaline solution having a pH buffer added or a pH buffer effect is used, pH fall can be suppressed and it is possible to make the quality of the passive film stable.

Also, to confirm the influence on corrosion resistance of the aqueous $Na_2CO_3$ which is the pH buffer, the following corrosion test was carried out.

TABLE 2

| PROCESS LIQUID | NaOH wt % | Na₂CO₃ wt % | pH | CORROSION CURRENT DENSITY µA/cm² |
|---|---|---|---|---|
| S | 0.0004 | 0 | 10.84 | 3.6 |
| T | 0 | 1.1 | 11.01 | 3.6 |
| U | 0.0003 | 0.11 | 10.81 | 3.5 |
| V | 0.0003 | 0.33 | 10.92 | 3.6 |
| W | 0.00002 | 0.53 | 10.99 | 3.7 |

In the corrosion test, the process liquid was varied in the passivation treatment step ST02 in the process of FIG. 1A, passive films were formed on test pieces with the respective process liquids, and the corrosion current densities of the test pieces were measured.

The process liquid temperature at the time of passivation treatment was 50° C., the immersion time was 10 min, the amount of oxygen dissolved in the process liquid by air bubbling was 7.0 to 7.9 mg/1000 cm³, and after the passivation treatment drying by heating was carried out at 110° C. for 10 min. The corrosion test conditions were the same as in the case of FIG. 2.

Process Liquid S was 0.0004 wt % aqueous NaOH with a pH of 10.84. The result was that the corrosion current density was 3.6 µA/cm².

Process Liquid T was 1.1 wt % aqueous Na₂CO₃ with a pH of 11.01. The result was that the corrosion current density was 3.6 µA/cm².

Process Liquid U was 0.0003 wt % aqueous NaOH with 0.11 wt % aqueous Na₂CO₃ added, and had a pH of 10.81. The result was that the corrosion current density was 3.5 µA/cm².

Process Liquid V was 0.0003 wt % aqueous NaOH with 0.33 wt % aqueous Na₂CO₃ added, and had a pH of 10.92. The result was that the corrosion current density was 3.6 µA/cm².

The composition of Process Liquid W was 0.00002 wt % aqueous NaOH with 0.53 wt % aqueous Na₂CO₃ added, with a pH of 10.99. The result was that the corrosion current density was 3.7 µA/cm².

Thus, adding aqueous Na₂CO₃, which is a pH buffer, to the alkaline solution, or using a pH buffer Na₂CO₃ solution showing alkalinity, does not influence corrosion resistance.

The alkaline solution of this invention is not limited to aqueous NaOH, and may alternatively be an aqueous solution of Na₂CO₃ (sodium carbonate), NaH₂PO₄ (sodium dihydrogen-phosphate), Na₂HPO₄ (disodium hydrogen-phosphate), Na₃PO₄ (trisodium phosphate), Na₄P₂O₇ (sodium pyrophosphate), Na₂O.nSiO (water glass (sodium silicate), Na₂B₄O₇ (sodium tetraborate), KOH (potassium hydroxide), K₂CO₃ (potassium carbonate), KH₂PO₄ (potassium dihydrogen phosphate), K₂HPO₄ (dipotassium hydrogen-phosphate), K₃PO₄ (tripotassium phosphate), K₄P₂O₇ (potassium pyrophosphate), or K₂B₄O₇ (potassium tetraborate).

The pH buffer of the invention is not limited to Na₂CO₃, and may alternatively be borax (Na₂B₄O₇), amino acid, alanine, aspartic acid, cystine, glutamine, glycine, isoleucine, leucine, methionine, phenylalanine, or proline.

Also, in this invention, although air bubbling was carried out for hydroxide formation promotion, there is no limitation to this, and alternatively showering (pouring the alkaline solution into the process tank in the form of a shower) may be carried out to dissolve more oxygen in the alkaline solution.

With reference to FIG. 8A a separator manufacturing method will be described.

(A) Stainless steel thin sheets 10 are press-formed in a press mold 31 (specifically, this is an upper die 32 and a lower die 33), to make multiple press-formed starting members 11.

(B) The press-formed starting members 11 are cleaned. Specifically, because grease applied to make good the lubrication between the stainless steel thin sheet 10 and the press mold 31 when the stainless steel thin sheet 10 is press-formed is adhered to the press-formed starting member 11, a cleaning liquid (the details of which will be discussed later) is sprayed on the press-formed starting member 11 with spraying devices 36 to remove the grease (degreasing), and then water (the details of which will be discussed later) is sprayed on the press-formed starting member 11 with other spraying devices to remove (rinse off) the cleaning liquid adhered to the press-formed starting member 11.

(C) An alkaline solution for passivation treatment (hereinafter, simply "passivation treatment liquid") is sprayed onto the press-formed starting member 11 with spraying devices 38 to effect passivation treatment, and a passive film is formed on the press-formed starting member 11.

At this time, because the spraying causes oxygen to dissolve in the passivation treatment liquid and the amount of oxygen dissolved in the passivation treatment liquid increases, hydroxide formation is promoted. For example, when a passive film having Fe, Cr, Ni hydroxides and oxide components is formed, when the separator is assembled to a fuel cell, even if the atmospheres around the electrodes become acidic during electricity generation of the fuel cell, acid corrosion can be suppressed, and stable generation can be maintained over a long period. The mechanism of the promotion of hydroxide formation is as described above.

(D) Because passivation treatment liquid has adhered to the film-formed member 17 obtained by forming the passive film, water is sprayed onto the film-formed member 17 with other spraying devices to rinse the film-formed member 17.

(E) The film-formed member 17 is dried by heating in a thermal dryer 18. When the film-formed member 17 is dried, the separator is finished.

In FIG. 8B, the press-formed starting member 11 consists of a base material 22 and a conductor 24 (for example Cr₂B) included in this base material 22, and has the conductor 24 partially exposed at the surface of the base material 22.

FIG. 8C shows a passive film 26 formed at the surface of the base material 22 of the film-formed member 17. The conductor 24 projects from the passive film 26 (i.e. is in a partially exposed state).

In FIG. 9, the processes from degreasing to drying by heating of stainless steel members of an embodiment (this embodiment) and a comparison example are compared. For the embodiment, the content of FIG. 1 will be explained in detail. The upper half shows the embodiment and the lower half shows the comparison example. STXXX in the figure denotes a step number.

First, the embodiment will be described step by step.

ST11: Spray degreasing is carried out. That is, degreasing is carried out by an alkaline solution for cleaning at 60° C. serving as the above-mentioned cleaning liquid being sprayed at the press-formed starting member at a pressure of 1 kgf/cm². The time required for this is 1 minute, and the amount of liquid used is 10 L (liters) (the amount sprayed per unit time is 10 L/min; this is the same in the embodiments below).

The alkaline solution for cleaning is a detergent (trade name: Pakuna Spray 50-N, maker name: Yuken Industries Co., Ltd.) made by adding a surfactant (polyoxyethylene=alkyl ether C12-15) to carbonate, phosphate, carboxylate alkaline salts (mainly sodium salt).

ST12: A spray rinsing W1 is carried out. That is, to remove alkaline solution for cleaning adhered to the press-formed starting member, rinsing is carried out by mains water or industrial water being sprayed onto the press-formed starting member as washing water. The time required for this is 0.25 minutes, and the amount of liquid used is 2.5 L.

ST13: A spray rinsing W2 is carried out. That is, to remove mains water or industrial water adhered to the press-formed starting member, rinsing is carried out by spraying ion-exchange water onto the press-formed starting member. The time required for this is 0.25 minutes, and the amount of liquid used is 2.5 L. The spray rinsing W1 and the spray rinsing W2 described above are provided to reduce costs by using mains water or industrial water, which are cheaper than ion-exchange water, and then remove any chlorine component included in the mains water or industrial water by using ion-exchange water. A chlorine component would impede the passivation reaction.

ST14: A spray passivation treatment is carried out. That is, aqueous NaOH (pH 9 to 12, 40 to 60° C.) is sprayed onto the press-formed starting member as a passivation treatment liquid to effect a passivation treatment. The time required for this is 10 minutes.

ST15: A spray rinsing W3 is carried out. That is, to remove passivation treatment liquid adhered to the film-formed member, the film-formed member is rinsed by being sprayed with ion-exchange water. The time required for this is 0.5 minutes, and the amount of liquid used is 5 L.

ST16: Drying by heating of the film-formed member is carried out at 100 to 200° C. The time required for this is 10 minutes.

From the above, the total time required in the embodiment from degreasing to thermal drying is 22 minutes. And, the total amount of liquid used in the spray degreasing and spray rinsing W1 through spray rinsing W3 is 20 L.

Next, the comparison example will be described step by step.

ST101: Ultrasonic degreasing is carried out. That is, ultrasonic degreasing of the press-formed starting member is carried out using an alkaline solution for cleaning. The time required for this is 5 minutes, and the amount of liquid used is 150 L (the immersion method is the overflow method, and the amount of overflow per unit time is 30 L/min; this is the same in the comparison examples below).

ST102: Immersion degreasing is carried out. That is, the press-formed starting member is degreased by being dipped in an alkaline solution for cleaning. The time required for this is 5 minutes, and the amount of liquid used is 150 L.

ST103: An immersion rinsing W1 is carried out. That is, the press-formed starting member is rinsed by being dipped in mains water. The time required for this is 1 minute, and the amount of liquid used is 30 L.

ST104: An immersion rinsing W2 is carried out. That is, the press-formed starting member is rinsed by being dipped in ion-exchange water. The time required for this is 1 minute, and the amount of liquid used is 30 L.

ST105: An immersion passivation treatment is carried out. That is, the press-formed starting member is dipped in an alkaline solution for passivation treatment, and a passivation treatment is thereby effected. The time required for this is 10 minutes.

ST106: An immersion rinsing W3 is carried out. That is, the film-formed member is rinsed by being dipped in ion-exchange water. The time required for this is 6 minutes, and the amount of liquid used is 180 L.

ST107: The film-formed member is dried by heating. The time required for this is 10 minutes.

From the above, the total time required in the comparison example from degreasing to thermal drying is 38 minutes. And, the total amount of liquid used in the degreasing and immersion rinsing W1 through immersion rinsing W3 is 540 L.

From the embodiment and the comparison example described above, the spray method of the embodiment made it possible to shorten the required time by 16 minutes and reduce the amount of liquid used by 520 L.

In FIG. 10A and FIG. 10B, an alkaline solution for cleaning was used to perform a comparison of the cleaning powers (degreasing powers) of spray cleaning and ultrasonic and immersion cleaning.

With reference to FIG. 10A, a flow of sample preparation and effect confirmation will be described step by step.

ST21: Etching is carried out to partially expose conductors on a stainless steel test piece.

ST22: Oil (a mixture of grease, machine oil and corrosion inhibitor) is applied to the sample piece.

The above-mentioned grease is trade name: COSMO GREASEMAX #1, composition: lubricating oil base oil about 91 wt %, thickening agent (lithium soap) about 7 wt %, lubricating oil additive about 2 wt %, maker name: Cosmo Oil Lubricants Co., Ltd.

The machine oil is trade name: No. 630 Press Machining Oil, composition: petroleum hydrocarbons (mineral oil) about 50 wt %, chlorine extreme pressure additive 10 to 50 wt %, sulfur extreme pressure additive 1 to 10 wt %, maker name: Nihon Kohsakuyu Co., Ltd.

The corrosion inhibitor is trade name: Non-Ruster P30F, composition: rust inhibitor additive, film-forming agent, solvent, maker name: Yushiro Chemical Industry Co., Ltd.

ST23: The test piece is cleaned with the alkaline solution for cleaning mentioned above.

At this time, (1) in the case of spray cleaning, the solution temperature is 60° C., the cleaning time is 1 minute, and the spray pressure is 1 kgf/cm$^2$, and (2) in the cases of ultrasonic cleaning and immersion cleaning, the solution temperature in the ultrasonic cleaning is 40° C. and the cleaning time is 5 minutes, and the solution temperature in the immersion cleaning is 40° C. and the cleaning time is 5 minutes.

ST24: The test piece is rinsed.

ST25: The test piece is dried.

ST26: To confirm the effect of the cleaning, the test piece is dipped in n-hexane solvent to extract grease remaining on the test piece by dissolving it in the n-hexane solvent.

ST27: The n-hexane solvent is spectroscopically analyzed with an infrared spectroscope, and its oil content is measured.

FIG. 10B is a graph showing the oil content of the test pieces obtained in FIG. 10A, the vertical axis showing oil content remaining on the test piece (in units of mg/cm$^2$) and the horizontal axis showing the cleaning methods.

In the case of no cleaning, the oil content was 3.5 mg/cm$^2$, in the cases of ultrasonic cleaning and immersion cleaning it was 0.55 mg/cm$^2$, and in the case of spray cleaning it was 0.15 mg/cm$^2$, so that with spray cleaning the oil content was 73% lower with respect to ultrasonic cleaning and immersion cleaning. That is, the cleaning power (degreasing power) of spray cleaning is highest.

Figure 11B:
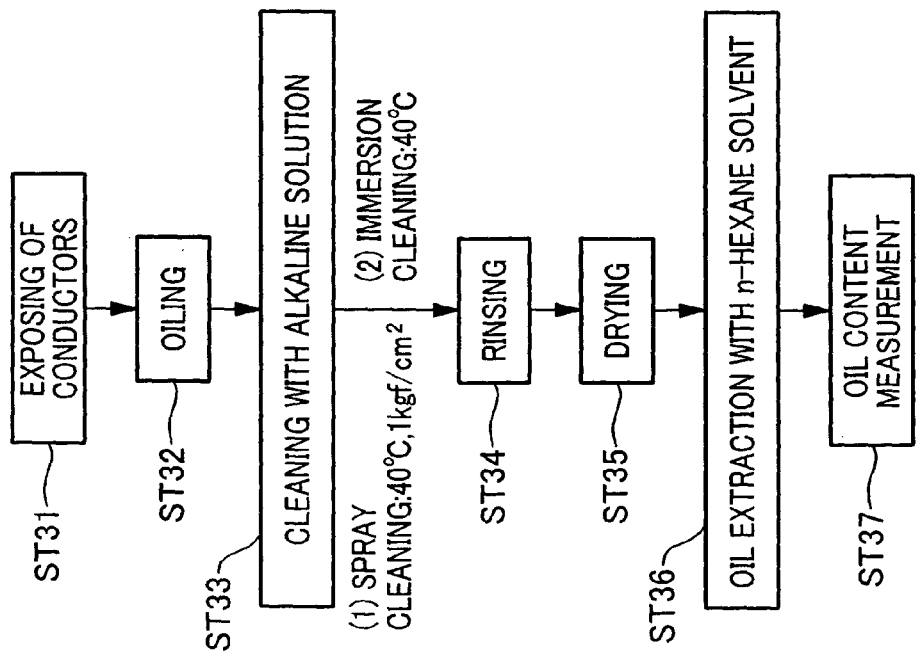
FIG. 11A and FIG. 11B are explanatory views showing a second experiment example for confirming a cleaning time of spray cleaning in a stainless steel separator manufacturing method according to the invention, FIG. 11A being a flow chart of sample preparation and effect confirmation and FIG. 11B a graph for comparison.
Figure 11A:
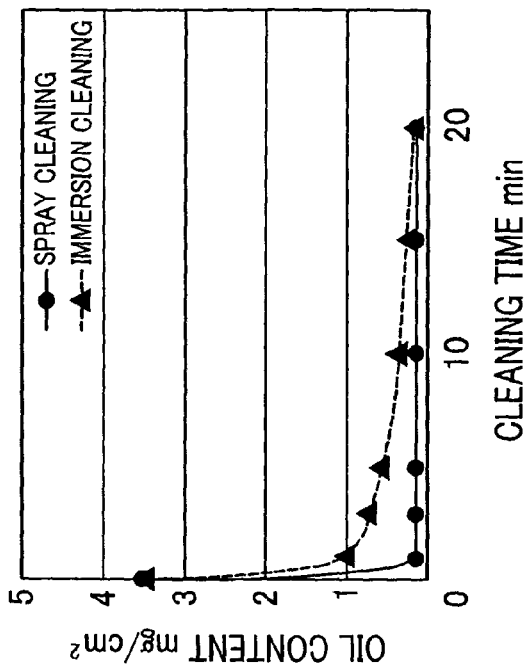

In FIG. 11A and FIG. 11B, using an alkaline solution for cleaning, a comparison of the variation with cleaning time of the cleaning powers (degreasing powers) of spray cleaning and immersion cleaning was carried out.

With reference to FIG. 11A, a flow of sample preparation and effect confirmation will be described step by step.

ST31: Etching is carried out to partially expose conductors on a stainless steel test piece.

ST32: An oil (the same one as that used in FIG. 10) is applied to the test piece.

ST33: The test piece is cleaned (degreased) with the alkaline solution for cleaning mentioned above.

At this time, (1) in the case of spray cleaning, the solution temperature is 40° C., and the spray pressure is 1 kgf/cm$^2$. (2) In the case of immersion cleaning, the solution temperature is 40° C.

ST34: The test piece is rinsed.

ST35: The test piece is dried.

ST36: To confirm the effect of the cleaning, the test piece is dipped in n-hexane solvent to extract grease remaining on the test piece by dissolving it in the n-hexane solvent.

ST37: The n-hexane solvent is spectroscopically analyzed with an infrared spectroscope, and the amount of oil remaining on the test piece is measured.

In the experiment, for each cleaning time, test pieces cleaned by spray cleaning and immersion cleaning were respectively prepared by the processes described above, and the amounts of oil on the test pieces were measured.

The cleaning times were made 0 (zero) minutes (no cleaning), 1 minute, 3 minutes, 5 minutes, 10 minutes, 15 minutes and 20 minutes.

FIG. 11B is a graph showing the relationship between the amounts of oil on the test pieces obtained in FIG. 11A and cleaning time, the vertical axis showing amount of oil (in units of mg/cm$^2$) and the horizontal axis showing cleaning time (in units of minutes).

With spray cleaning, from the oil content of 3.5 mg/cm$^2$ of before cleaning it decreased steeply to 0.14 mg/cm$^2$ in a cleaning time of 1 minute, and thereafter was roughly flat.

With respect to this, with immersion cleaning, the oil content of 3.5 mg/cm$^2$ before cleaning decreased in a cleaning time of 1 minute to 1.0 mg/cm$^2$, and thereafter the oil content fell with time and after 20 minutes became approximately the same as in the case of spray cleaning (spray cleaning 0.08 mg/cm$^2$, immersion cleaning 0.13 mg/cm$^2$).

Thus, with spray cleaning the cleaning time (degreasing time) can be greatly shortened compared to immersion cleaning.

In FIG. 12, a comparison of variation of cleaning power with rinsing time with spray rinsing and immersion rinsing was carried out.

Figure 12B:
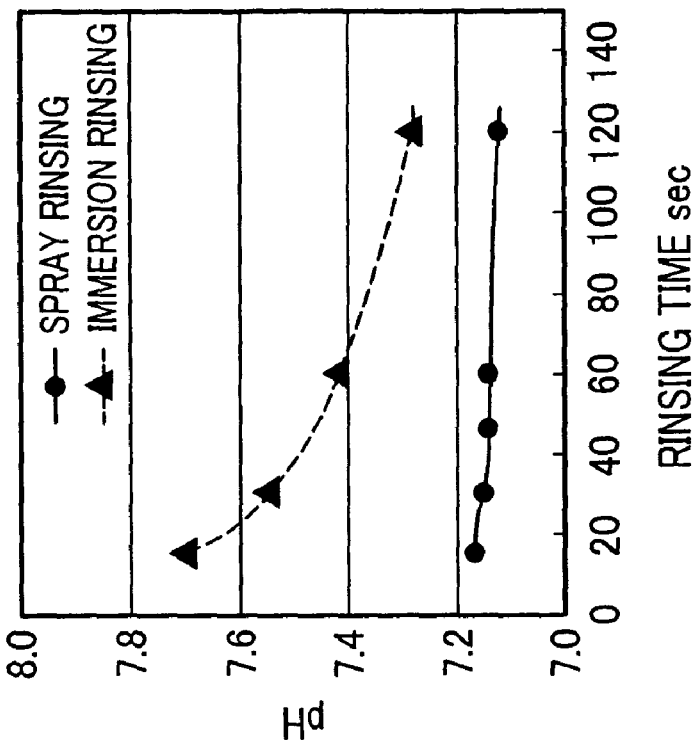
FIG. 12A and FIG. 12B are explanatory views showing a third experiment example for confirming a rinsing time of spray rinsing in a stainless steel separator manufacturing method according to the invention, FIG. 12A being a flow chart of sample preparation and effect confirmation and FIG. 12B a graph for comparison.
Figure 12A:
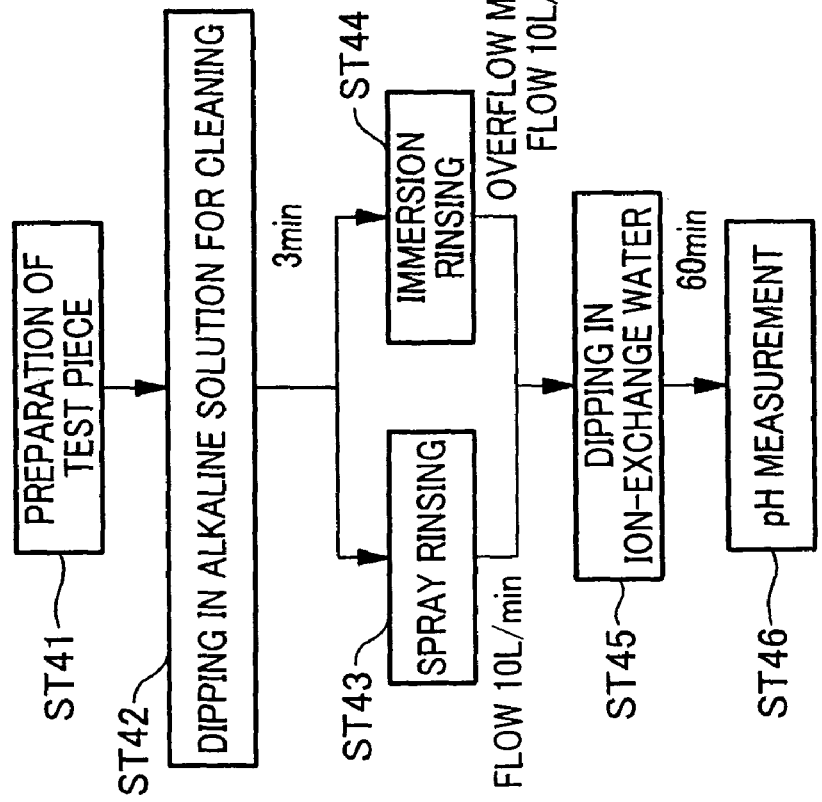

With reference to FIG. 12A, a flow of sample preparation and effect confirmation will be described step by step.

ST41: A test piece made of stainless steel with added boron is prepared.

ST42: The test piece is dipped in an alkaline solution for cleaning for 3 minutes.

ST43: In the case of spray rinsing, the amount of water sprayed on the test piece is made 10 L/minute.

ST44: In the case of immersion rinsing, the amount of water in overflow immersion is made 10 L/min.

ST45: The test piece is immersed in ion-exchange water for 60 minutes.

ST46: The pH of the ion-exchange water in which the test piece was dipped is measured.

In the experiment, for each rinsing time, a test piece rinsed by spray rinsing and a test piece rinsed by immersion rinsing were prepared by the process described above, and after each test piece was immersed in the ion-exchange water its pH was measured.

The rinsing times were made 15 minutes, 30 minutes and 45 minutes (spray rinsing only), 60 minutes and 120 minutes.

FIG. 12B is a graph showing the relationship between the pH of the ion-exchange water and the rinsing time, the vertical axis showing pH and the horizontal axis showing rinsing time (in units of sec).

With spray rinsing, at rinsing time 15 minutes the pH had fallen to 7.17, and with respect to further increase of the rinsing time the pH remained roughly flat.

With respect to this, in the case of immersion rinsing, at rinsing time 15 minutes the pH had only fallen as far as 7.70, and thereafter, although it gradually fell as the rinsing time increased, even at rinsing time 120 minutes the pH had not fallen as far as the pH in the case of spray rinsing.

Thus, with spray rinsing it is possible to lower the pH in a shorter time compared to immersion rinsing, i.e. quicker rinsing is possible.

Figure 13:
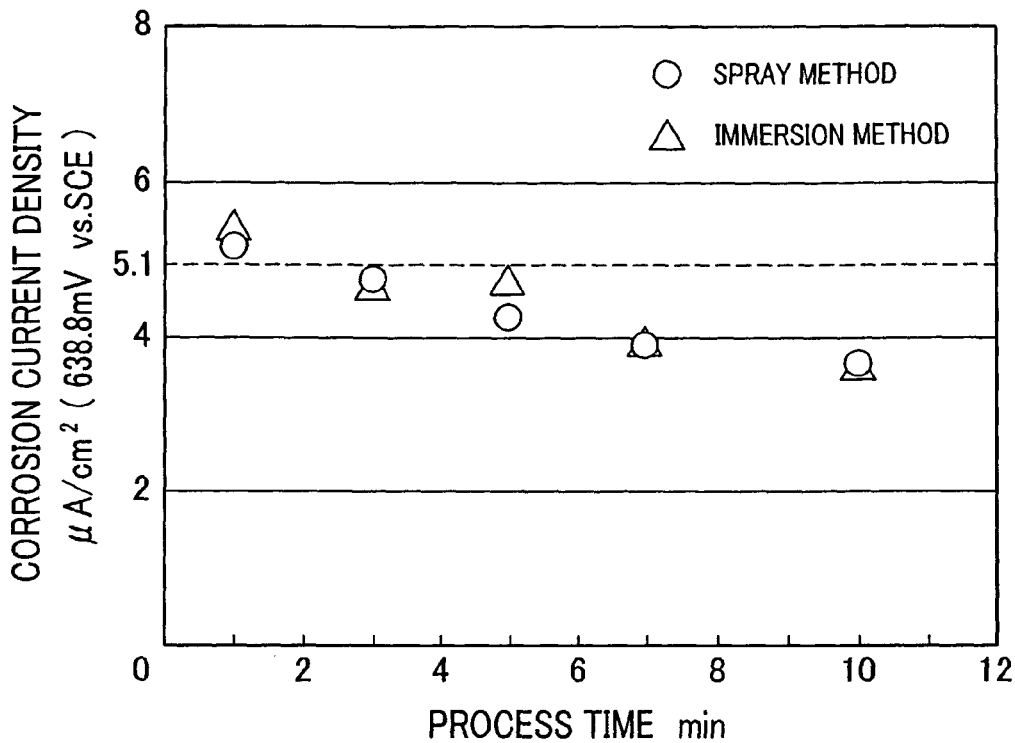
FIG. 13 is a graph showing a fourth experiment example for confirming a passivation treatment effect of spraying in a stainless steel separator manufacturing method according to the invention.

In FIG. 13, the corrosion current densities of test pieces (having finally undergone drying by heating) having had passive films formed on them with different process times respectively by passivation treatment by spraying and passivation treatment by immersion were measured and compared. Three test pieces were prepared for each set of process conditions to measure the corrosion current densities, and the averages of the threes were plotted on the graph. The vertical axis of the graph shows corrosion current density (in units of μA/cm$^2$), and the horizontal axis shows process time of the passivation treatment (in units of min). The dashed line is the necessary value of the corrosion current density (5.1 μA/cm$^2$).

The corrosion test conditions are shown below.

Corrosion Test Conditions test solution: sulfuric acid (pH 3, concentration 0.005%, temperature 90° C.)

test piece potential: constant 638.8 mV (set with reference to a saturated calomel electrode (SCE)), hereinafter referred to as "638.8 mV vs. SCE"

test method: measure corrosion current density after holding the above test piece potential for 30 minutes The passivation treatment conditions are shown below.

Spray Method process liquid: aqueous NaOH (pH 10.7 to 11, temperature 60° C.)

spray quantity: 100 L/minute spray time: 10 minutes thermal drying: 110° C., 10 minutes Immersion Method process liquid: aqueous NaOH (pH 10.8, temperature 50° C.)

immersion time: 10 minutes thermal drying: 110° C., 10 minutes

The corrosion current densities in the cases of the spray method and the immersion method had similar values at each of the process times. That is, in the cases of both the spray method and the immersion method, at 3 minutes and over the necessary value was achieved, and there was no difference in the process time between the spray method and the immersion method.

Figure 14:
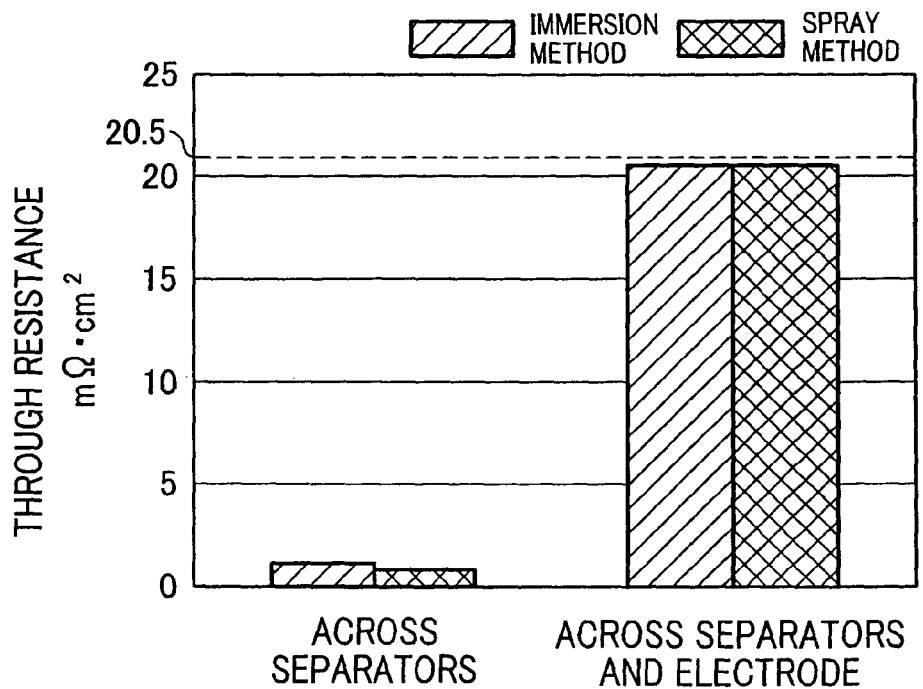
FIG. 14 is a graph showing a fifth experiment example for confirming a through resistance of a separator passivation-treated by spraying in a stainless steel separator manufacturing method according to the invention.

In FIG. 14 the through resistances (contact resistances) of a separator manufactured by the spray method and a separator manufactured by the immersion method have been measured and compared. The vertical axis of the graph shows through resistance (in units of mΩ·cm$^2$) and the horizontal axis shows two conditions of the time of measurement of the through resistance.

As the conditions of the time of measurement of the through resistance, in one case two separators were brought into contact with each other and the through resistance across them was measured, and in the other case one sheet of carbon paper constituting an electrode was sandwiched between two separators and the through resistance across the separators (here written across separators/electrode) was measured. The face pressure across the separators at the time of the through resistance measurement was that at which the through resistance stabilized as the face pressure was gradually increased.

The passivation treatment conditions are shown below.

Spray Method
　　process liquid: aqueous NaOH (pH 10.7 to 11, temperature 60° C.)
　　　spray quantity: 100 L/minute
　　　spray time: 10 minutes
　　　thermal drying: 110° C., 10 minutes Immersion Method
　　process liquid: aqueous NaOH (pH 10.8, temperature 50° C.)
　　　immersion time: 10 minutes
　　　thermal drying: 110° C., 10 minutes The through resistance across the separators and the through resistance across the separators/electrode in the cases of the spray method and the immersion method were equal, and the through resistance across the separators/electrode was below the target value of 20.5 $m\Omega \cdot cm^2$.

In this invention hydroxide formation was promoted by the alkaline solution for passivation treatment being showered, but in addition to the showering of the alkaline solution for passivation treatment, hydroxide formation may be further promoted by air being blown (i.e. air-bubbled) into the tank in which the alkaline solution for passivation treatment is stored.

INDUSTRIAL APPLICABILITY

In this invention, because a passive film is formed at the surface of a stainless steel member by the stainless steel member being immersed in an alkaline solution of pH 9 to 12 at 40 to 60° C., there is no solving out of metal ions from the stainless steel member and the passivation treatment can be carried out by immersion in a single solution, and cost reductions including waste processing can be achieved. And at the same time, the process can be made rapid by cleaning such as degreasing and the passivation treatment being carried out by spraying. Thus, the invention is useful in the manufacture of fuel cells.

The invention claimed is:

1. A stainless steel member passivation treatment method for forming a passive film on a surface of the stainless steel member, said method comprising the steps of:
　　providing an alkaline solution having a pH of 9 to 12, said alkaline solution comprising a pH buffer;
　　immersing the stainless steel member in the alkaline solution at 40 to 60° C. while air is being blown into the alkaline solution to form air bubbles that increase the amount of oxygen dissolved in the alkaline solution and thereby promote the formation of hydroxides constituting the passive film, wherein the hydroxides constituting the passive film are produced from metal ions constituting the stainless steel and hydroxide ions in the alkaline solution, and wherein the pH buffer suppresses a reduction in the pH of the alkaline solution that would otherwise be caused by the dissolution of carbon dioxide into the alkaline solution by the air bubbles; and
　　after the immersing step, thermally drying the member at 100 to 200° C.

2. A stainless steel member passivation treatment method according to claim 1, wherein the stainless steel member is a separator for use in a fuel cell.

* * * * *